(12) United States Patent
Gupta et al.

(10) Patent No.: US 6,233,585 B1
(45) Date of Patent: *May 15, 2001

(54) ISOLATION LEVELS AND COMPENSATING TRANSACTIONS IN AN INFORMATION SYSTEM

(75) Inventors: Prashant Gupta, Monterey; David S. Rubin, San Francisco, both of CA (US)

(73) Assignee: CrossWorlds Software, Inc., Burlingame, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,281

(22) Filed: Mar. 12, 1998

(51) Int. Cl.[7] .................................................. G06F 17/30
(52) U.S. Cl. ........................... 707/103; 707/10; 707/104
(58) Field of Search ............................ 707/10, 103, 104, 707/9, 8, 200; 711/118; 709/205, 200

(56) References Cited

U.S. PATENT DOCUMENTS

| | | | |
|---|---|---|---|
| 5,212,788 | * 5/1993 | Lomet et al. | 707/10 |
| 5,280,612 | * 1/1994 | Lorie et al. | 707/203 |
| 5,758,083 | * 5/1998 | Singh et al. | 395/200.53 |
| 5,758,149 | * 5/1998 | Bierma et al. | 707/8 |
| 5,781,910 | * 7/1998 | Gostanian et al. | 707/201 |
| 5,829,022 | * 10/1998 | Watanabe et al. | 711/118 |
| 5,864,679 | * 1/1999 | Kanai et al. | 395/200.68 |
| 5,878,415 | * 3/1999 | Olds | 707/9 |
| 5,913,061 | * 6/1999 | Gupta et al. | 395/680 |
| 5,923,844 | * 7/1999 | Pommier et al. | 395/200.35 |
| 5,944,785 | * 8/1999 | Pommier et al. | 709/205 |
| 6,047,314 | * 4/2000 | Pommier et al. | 709/205 |

OTHER PUBLICATIONS

Wiederhold et al, Consistency Control of Replicated Data in Federated Databases, IEEE, pp. 130–132, Nov. 1990.*
Lam et al, Preemptive Transaction Scheduling in Hard Real–Time Database Systems, Journal of Systems Architecture, vol., 43, Issue: 9, pp. 625–637, Aug. 1997.*
Byun et al, Nonblocking Two–Phase Commit Protocol to Avoid Unnecessary Transaction Abort for Distributed Systems, Journal of Systems Architecture, vol., 43, Issue: 1–5, pp. 245–254, Mar. 1997.*

(List continued on next page.)

Primary Examiner—Thomas Black
Assistant Examiner—Frantz Coby
(74) Attorney, Agent, or Firm—Fish & Richardson PC

(57) ABSTRACT

A transaction system implemented on a server machine for maintaining consistency in an information system supporting asynchronous transactions. The information system includes a database shared among a plurality of users and implemented on a client machine. The transaction system is invoked at run-time for a transaction where the transaction includes one or more subtransaction steps. The transaction system includes a graphical user interface for receiving a user defined isolation level selection for executing a transaction between the server machine and the database or application, a persistent service for storing object state information for each object affected in the execution of each subtransaction step and a state verification service for verifying the state of each object affected by a subtransaction step to verify the state of the object is the same as a last time the object was seen in the transaction.

10 Claims, 6 Drawing Sheets

OTHER PUBLICATIONS

Kramer, Application of Transaction Processing for Session Management in Multi–Media Information Networks, Global Telecommunications Conference IEEE, pp. 764–769, Dec. 1992.*

Gray et al., "Transaction Processing Concepts and Techniques, Transactional Workflow." presentation, 1–31., no date.

Garcia–Molina et al., "SAGAS," Chapter 3, Transaction Management, ACM. 1987, 290–299.

Wächter et al., "The Contract Model", Chapter 3, Transaction Management, 301–321, no date.

"Recovery and Concurrency," chapter 16, 401–418, no date.

* cited by examiner

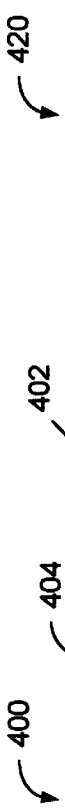

ISOLATION LEVELS AND COMPENSATING TRANSACTIONS IN AN INFORMATION SYSTEM

The present invention relates generally to computing systems, and more particularly to a method and apparatus for processing asynchronous transactions in an information system.

BACKGROUND

An information or database system is a repository for a collection of computerized data files (the database). An information system may include database management functions, in the form of a database management system, for allowing one or more users to access, retrieve, and modify information in the database. The database consists of a collection of persistent data that may be used by the application systems of some given enterprise. Typically, many such users may access the database at given time. One function of the database management system is to guard against the many threats presented to the data in the database. Tools for safeguarding database data may include recovery, concurrency, security and integrity tools.

Recovery and concurrency are related notions that involve transaction processing. A transaction is a logical unit of work. A transaction may involve one or more accesses to the database and may include or more updates to information stored in the database. Even though many database actions may be invoked, a transaction is considered to be an atomic unit. Classical transaction processing provides that if a transaction executes some updates to a database and then a failure occurs before the transaction reaches its normal termination, then those updates will be undone.

In order to facilitate transaction processing, the database management system may include a transaction manager. The transaction manager oversees transactions to the database and may use tools such as COMMIT and ROLLBACK operations to provide the atomicity required to support transaction processing. A COMMIT operation signals a successful end-of-transaction, that a logical unit of work, a transaction, has been completed. A ROLLBACK operation signals an unsuccessful end-of-transaction indicating that the database may be in an inconsistent state. Recovery refers to those operations initiated by the transaction manager in response to a ROLLBACK.

Concurrency refers to the interaction of transactions executed by multiple users. A concurrency manager or other concurrency control mechanism may be provided as part of the database management functions to ensure that concurrent transactions do not interfere with each other's operation. A concurrency control mechanism can alleviate problems related to lost updates, uncommitted dependency and inconsistent analysis problems. A more detailed description of concurrency problems is described in "An Introduction to Database Systems", fifth edition, 1991, by C. J. Date and published by Addison Wesley.

One conventional solution to concurrency problems is the use of locks. Locking provides an assurance that one transaction can rely on the state of a particular portion of a database, and not be concerned with another transaction modifying the state of the data.

Conventional concurrency managers employ two kinds of lock, namely exclusive locks (X locks) and shared locks (S locks). Only one transaction can hold an X lock on a transaction record at a time. Two or more transactions may maintain S locks on the same record. For example, if transaction A holds an exclusive (X) lock on record R, then a request from transaction B for a lock of either type on R will cause B to go into a wait state. B will wait until A's lock is released. If transaction A holds a shared (S) lock on record R, then a request from transaction B for an X lock on R will cause B to go into a wait state (and B will wait until A's lock is released). However, a request from transaction B for an S lock on R will be granted (that is, B will now also hold an S lock on R).

Transaction requests for record locks are normally implicit. When a transaction successfully retrieves a record, it automatically acquires an S lock on that record. When a transaction successfully updates a record, it automatically acquires an X lock on that record. If the transaction already holds an S lock on the record, then the update will "promote" the S lock to X level. X locks are held until the next synchpoint. A synchpoint represents the boundary between two consecutive transactions; it thus corresponds to the end of a logical unit of work, and hence to a point at which the database is (or should be) in a state of consistency. Typically, the only operations that establish a synchpoint are COMMIT, ROLLBACK, and program initiation. S locks are also normally held until the next synchpoint.

The typical role of any transaction service is to ensure the classical ACID properties of transactions. These include; Atomicity, Consistency, Isolation, and Durability.

Atomicity refers to the property of a transaction service in which either all steps of a transaction are done or no steps are done. Consistency refers to the transitioning of data from one well known state to another well known state. The isolation property, as the term suggests, provides that data modifications made within the scope of a transaction are isolated from other transactional data modifications. In other words, intermediate results of a transaction are not "exposed" to other transactions. The durability property ensures that data modifications made within the scope of a transaction are guaranteed to be saved on disk.

In short, it is the job of the transaction service to ensure that state changes to persistent data are made in such a way that they are isolated from state changes made by other processes and can be "recovered" (that is in case of a failure we can restore an object to a well known state). While locking provides guarantees for concurrency, problems arise in processing long-lived or asynchronous transactions. As was described above, locks remain in place until the completion of a transaction and the occurrence of a next synchpoint. However, where long-lived transactions arise, locks to the database can result in inefficient performance. For example, a business transaction may include a request for quotations to be sent out to various suppliers. The transaction will complete at some indeterminate time in the future when one or more of the bids have been returned. Obviously, it would be inefficient to tie up resources in a database while waiting for these type of long lived transactions.

In classical online transaction processing (OLTP) systems, the workload consists of small, short duration transactions that touch a small amount of data and complete (e.g., the classical airline reservation system) very quickly. In systems that exhibit long-lived transactions, the workloads may consist of transactions that touch data that lives across a WAN, or a transaction that references data through a reliable messaging provider (i.e. where the application need not be executing). In either case, the semantics of the workload is radically different then the classical OLTP workload. For these workloads, conventional locking schemes provided by transaction processing systems are woefully inadequate.

SUMMARY OF THE INVENTION

In general, in one aspect, the invention provides a transaction system implemented on a server machine for maintaining consistency in an information system supporting asynchronous transactions. The information system includes a database shared among a plurality of users and implemented on a client machine. The transaction system is invoked at run-time for a transaction where the transaction includes one or more subtransaction steps. The transaction system includes a graphical user interface for receiving a user defined isolation level selection for executing a transaction between the server machine and the database or application, a persistent service for storing object state information for each object affected in the execution of each subtransaction step and a state verification service for verifying the state of each object affected by a subtransaction step to verify the state of the object is the same as a last time the object was seen in the transaction.

Aspects of the invention include numerous features. The isolation level selection may vary across a range from consistent service to continuous service where consistent service meets all ACID properties at a subtransaction level and continuous service provides no guarantees of any of the ACID properties in the execution of a subtransaction. The consistent service includes isolation level 3 reads for guaranteeing consistency of reads over a time period in which each subtransaction is executed.

The isolation level selection includes stringent isolation service and no isolation service. The stringent isolation service provides compliance to all ACID transactional properties at the subtransaction level and the no isolation service provides no guarantees of any ACID properties in the execution of a subtransaction.

The transaction system includes a best effort isolation service where both the best effort service and the stringent service provide compliance to all ACID properties but the stringent service includes isolation level 3 reads to guarantee consistency over an entire time a subtransaction step is executing. The transaction system includes a minimal effort isolation service where the state verification service is disabled and no object state checks are performed prior to execution of a subtransaction step. The transaction system includes a no effort isolation level selection which results execution of a transaction until a consistency error is returned during subtransaction processing.

The transaction system includes a saga service for maintaining a linked list of subtransaction records and compensating transaction records as a transaction is executed and a recovery service for implementing compensating transactions upon the occurrence of a fault in a forward progress of the execution of a transaction.

In another aspect, the invention provides a method implemented on a server machine for maintaining consistency in an information system where the information system includes a database shared among a plurality of users and implemented on a client machine. The method is invoked at run-time for a transaction where the transaction includes one or more subtransaction steps. The method includes selecting a predefined service level selection for executing a transaction between the server machine and the database applications, storing object state information for each object affected in the execution of each subtransaction step and checking a state of each object affected by a subtransaction step to verify the state of the object is the same as a last time the object was seen in the transaction. If the state does not match a last known state, then the forward execution progress for the transaction is stopped.

In another aspect, the invention provides a collaboration implemented on a server machine including business logic for directing the interaction of independent applications and includes a plurality of connectors for communicating with a like plurality of applications, an interchange server including an application collaboration module and service module. The application collaboration module defines the interoperability between two or more applications and includes a transaction having one or more subtransaction steps for delivering data to one or more connectors for transfer to an associated application. The interchange server includes a service module including a transaction system for maintaining consistency in databases managed by the applications. The transaction system includes a graphical user interface for configuring a user defined isolation level selection for characterizing an isolation level to be maintained during transaction execution, a persistent service for storing object state information for each object affected in the execution of each subtransaction step and a state verification service for verifying the state of each object affected by a subtransaction step to verify the state of the object is the same as a last time the object was seen in the transaction.

Aspects of the invention include numerous advantages. One advantage of the invention is that a flexible transaction service is provided so that clients of the service may request the appropriate level of service that is needed. With each differing level of service provided, the transaction service ensures the appropriate transactional and recovery semantics. The transaction service is easy to configure, provides the appropriate interfaces to other interchange clients, and provides extensibility. Other advantages and features will be apparent from the following description and claims.

BRIEF DESCRIPTION OF THE DRAWINGS

FIG. 3a is a schematic block diagram for a transaction according to the invention.

FIG. 3b is a schematic block diagram for a compensating transaction according to the invention.

FIG. 4b is a sample transaction associated with the flow diagram of FIG. 4a.

FIG. 4c is a sample saga generated in association with the flow diagram of FIG. 4a.

DETAILED DESCRIDTION

The preferred embodiment of the present invention operates in the context of a collaboration architecture as disclosed in commonly owned U.S. patent application Ser. No. 08/780,593, filed Jan. 8, 1997, which is hereby incorporated by reference. The preferred embodiment is used to provide a flexible transaction system within collaborations as defined in the above-referenced application.

Figure 1:
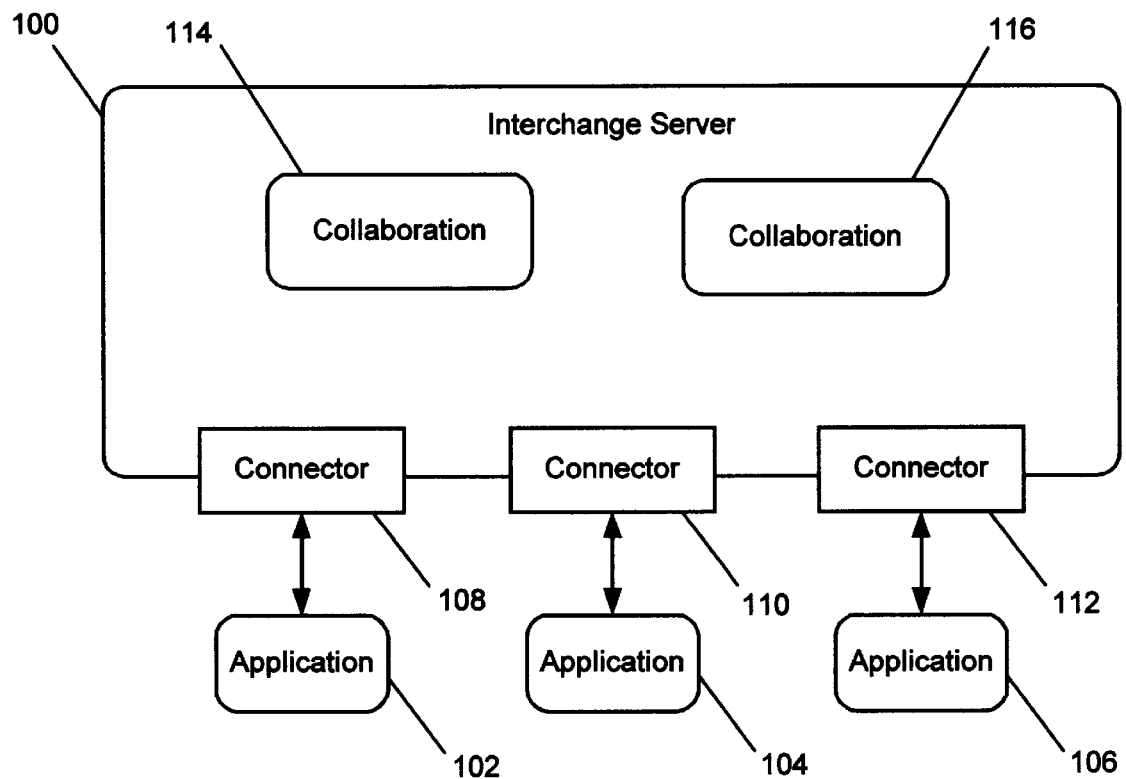
FIG. 1 is a schematic block diagram of a modular application collaboration according the invention.

In general, the collaboration architecture supports the interaction of independent applications which would be incompatible and could not directly interact with one another on their own. An example of the structure of a collaboration architecture is shown in FIG. 1. A collaboration architecture provides an interchange server 100 for interaction between independent applications 102, 104, 106. Interchange server 100 preferably operates between applications 102, 104, 106 where applications 102, 104, 106 are connected to interchange server 100 by corresponding connectors 108, 110, 112. Connectors 108, 110, 112 are then associated with collaborations 114, 116 located within interchange server 100. Collaborations 114, 116 represent one or more processes. Each process is a transaction involving one or more of applications 102, 104, 106. Thus, collaborations 114, 116 serve as common meeting points for the interaction and exchange of data among applications 102, 104, 106.

For example, collaboration 114 may include a process which requires receiving data from application 102 and sending a portion of that data to application 104 in a different format. Application 102 sends data into connector 108. Connector 108 transforms the data into an interchange format object and publishes an event indicating the availability of the data. Collaboration 114 receives the object as a subscriber to that event. Collaboration 114 performs its process and generates an object to be sent to connector 110. Connector 110 transforms the object into an appropriate format and initiates an appropriate function in application 104. In this way, a process is accomplished which requires interaction from two applications 102, 104 which are independently incompatible.

Figure 2:
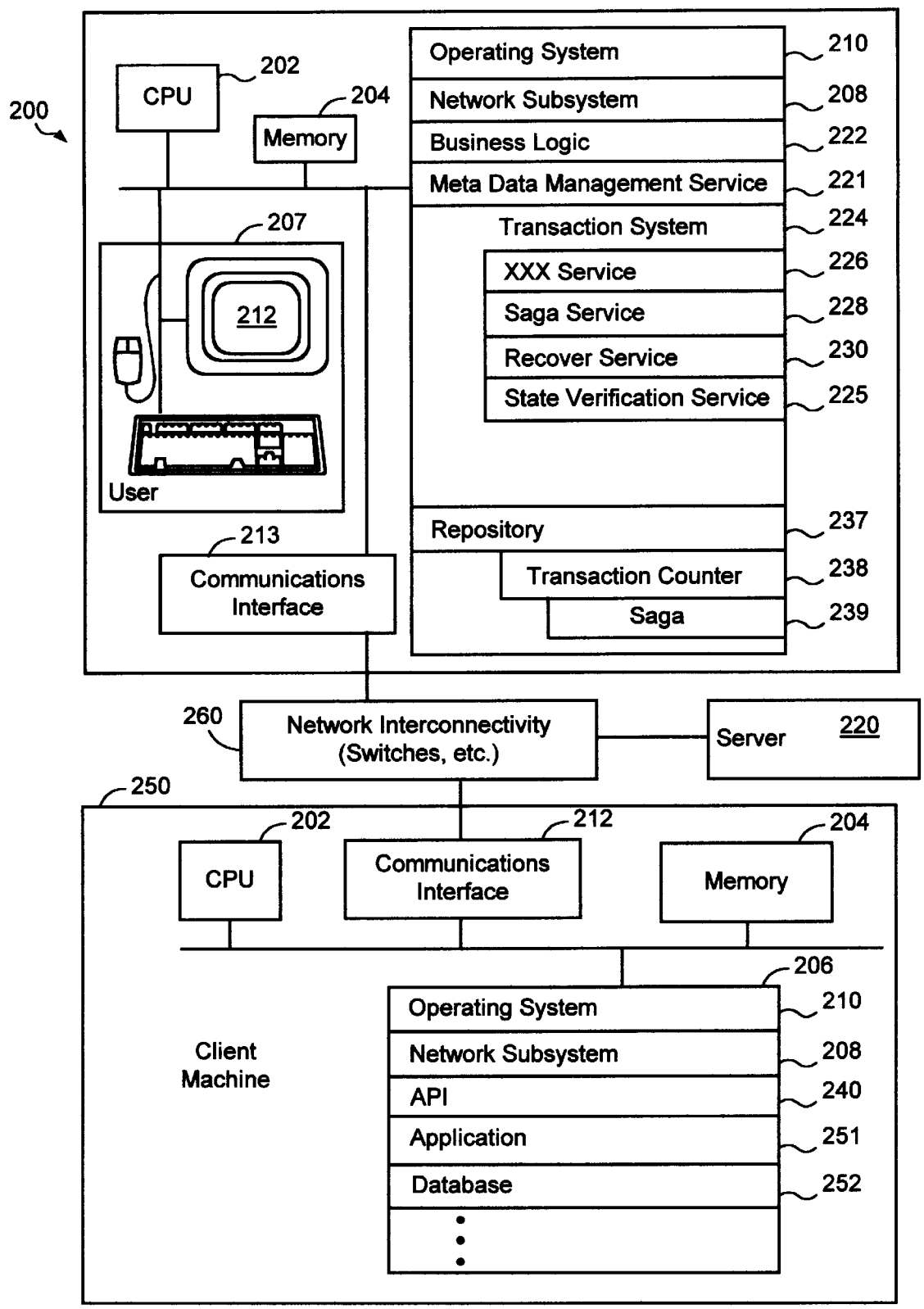
FIG. 2 is a schematic block diagram of a distributed computer system including a transaction system according the invention.

A more generic architecture for processing asynchronous transactions according to the invention is shown in FIG. 2. A distributed computing system 200 includes a server machine 220 and a client machine 250. Each of server machine 220 and the client machine 250 may include a central processing unit 202, memory 204, disk subsystem 206, network subsystem 208, an operating system 210 and a communications interface 212. Each provides the necessary services for application programs to run. Memory 204 may include volatile and non-volatile random access memory (RAM) as well as read only memory (ROM). Disk subsystem 206 in server machine 220 may be used to store executable programs, for example business applications (business logic) or collaborations, while disk subsystem 206 in client machine 250 may be used to store applications 251 and a database 252. Network subsystem 208 facilitates communications through communications interface 212 with applications executing on other server machines 220 and client machine 250. The various client and server machines are connected by a network 260. The network may be of the form of an intranet, internet, local area network or other similar device.

Server machine 220 may incorporate business logic 222 that is responsible for carrying out certain predefined requests against application API's such that the nature of a business problem is addressed. For the purposes of this example, server machine 220 provides requests to API 240 (in client machine 250) for communicating with an application 251 executing on client machine 250. Server machine 220 includes a transaction system 224, meta-data management service 221 and user interface 207.

Transaction system 224 provides support for asynchronous or long-lived transactions and includes methods for setting and supporting isolation levels (service levels). Transaction system 224 allows clients to request an appropriate level of service that is needed. With each differing level of service provided, transaction system 224 ensures the appropriate transactional and recovery semantics. Transaction system 224 includes a state verification service 225, persistent service 226, saga service 228 and recovery service 230.

State verification service 225 checks state information associated with objects indicated by a transaction. Specifically, the state verification service is invoked at runtime for a transaction. As each subtransaction step is executed, state verification service 225 checks the state of each object affected by a given transaction step to verify that the current state of the object is the same as the last time the same object was seen in the transaction.

Persistent service 226 is responsible for ensuring the persistent state of information. All other components of the transaction system rely on the correct operation of the persistent service. All object state information needed to execute an undo operation must be stored persistently at run time. Associated with persistent service 226 is a repository 227 for logging object state information and compensating transaction information associated with transactions executed in accordance with business logic 222.

Saga service 228 is responsible for ensuring transaction correctness including controlling the semantics of "begin transaction", "commit transaction", and "abort transaction" operations. Saga service 228 creates a "saga" defined below) which defines a transaction for interaction between applications executing on server and client machines 220 and 250 respectively, along with an accompanying compensating transaction for undoing the transaction in the event of an abort (transaction failure).

Recovery service 230 is responsible for ensuring the transactional correctness after a failure. Furthermore, it is the responsibility of the recovery service to define what types of failures are recoverable, and the methodology for recovery (i.e. roll back versus roll forward).

The operation of each of these services is discussed in greater detail below.

Meta-data management service 224 includes methods for displaying service requests on a graphical user interface (GUI) 212 of user interface 207. The service requests prompt a user to define isolation level selections for use in processing business logic 222 which may in turn be stored in repository 237. The processing of business logic 222 and the use of the user defined isolation levels is discussed in greater detail below.

Client machine 250 may execute an application 251 and initiate or respond to transactions requiring the transfer of data to or from server machine 220. API 240 provides a method of communicating requests for data retrieval, data insert, data update, or data delete to application 251 running on client machine 250. For the purposes of these discussions, data resident in the client, located, for example in database 252, is to be manipulated by a transaction initiated by server machine 220. API 240 does not provide any interfaces for interaction with any external transaction coordinator. Thus it does not expose, for external use, any notion of "transactional" behavior.

A fundamental problem that is addressed by the transaction system disclosed herein is to interact with a generic API (that does not expose transactional interfaces) on behalf of business logic executing on the server such that the notion of transactional work can be achieved. Transactional work is defined as a sequence of operations that exhibit the ACID properties.

A transaction system that interacts with application APIs can not use exclusive locking (because it is not exposed through the APIs), thus it must rely solely on the functionality provided by the API to achieve the ACID properties.

In the invention, business logic 222 exposes a GUI that allows the user to specify one of four separate transactional isolation levels: stringent, best effort, minimal effort and none. The selection of the particular isolation level define requirements for storage of state information as well as methodologies for responses to failed subtransaction steps. From stringent on down, each subsequent level offers the user a tradeoff between guarantees of the transactional ACID properties and system performance. Less restrictive levels of service (minimal effort and none), provide little or no guarantee of the ACID properties, however, less and less system overhead is needed by the transaction system to execute these transactions (thus providing greater degrees of system throughput). In order to understand the operation of each of the levels of service, a sample transaction is defined.

Referring now to FIG. 3a, business logic 222 (FIG. 2) may include one or more transactions 300. A transaction 300 may include one or more subtransactions 302. Each subtransaction includes an object identifier 304 for identifying all business objects that are to be affected by the subtransaction, a verb 306 describing the action performed as part of the subtransaction and values 308 (or a business object) to be used with the verb.

Transaction 300 has associated therewith a compensating saga chain 310 which may be executed in the event of failure of transaction 300. The saga chain 310 may include one or more compensating transactions 312. A one to one mapping of subtransactions and compensating transactions may exist. Each compensating transaction 312 includes an object identifier 314 for identifying all business objects that are to be affected by the compensating transaction, a compensating verb 316 describing the action performed as part of the compensating transaction and values 318 (or business object) to be used with the compensating verb.

The content creation for compensating transactions is left to the developer of the business logic. What particular steps form a compensating transaction is defined by that developer. At the time for execution of a transaction (run-time), transaction system 224 (particularly saga service 228) develops a "saga" defining the transaction (and sub-transactions) and any associated compensating transaction as provided by the business logic. A saga is a set of subtransaction steps with correlated compensating transaction steps such that there exists one and only one atomic compensating transaction that contains logic that will semantically undo the affects of each subtransaction step. The saga forms a queue that records necessary information associated with the transaction and associated compensating transaction steps so that logical "undo" of a transaction may be implemented upon the detection of a failure condition. Saga service 228 is used to create and modify saga.

At the time of execution (run-time), a transaction 300 may result in the retrieval, update or other manipulation of a record (business object) stored in database 252. At each subtransaction step, a business object may be manipulated according to the subtransaction verb. At the completion of each sub transaction step, the persistent service may be invoked to maintain a listing of the subtransaction steps performed as well as the state of any objects and the isolation level requested for the transaction service.

Given the basic transaction architecture, the operation of the transaction service including persistent service, saga service and recovery service for each level of isolation may be described.

Stringent Level

The stringent isolation level is characterized by stringent entry criteria which are defined before each subtransaction step (or a compensating transaction) is executed. If the entry criteria fails, the step (or compensation) fails with an "isolation fault". If the fault has occurred at the subtransaction step, the transaction is aborted and the recovery service begins compensation. If the fault occurred at the compensation, a detailed trace event may be logged, and the saga is aborted. In a preferred embodiment, upon detection of a fault when executing a compensating transaction, the saga is aborted and request for human intervention is generated.

Stringent entry criteria is maintained as follows: as each subtransaction executes, the subsequent state of all business objects affected is logged persistently as part of the transaction context in, for example, repository 237. Upon entry to each new subtransaction step, a test is performed. For each business object about to be affected by this step (as indicated by the object identifier), a search is conducted in the context of the transaction. More particularly, each affected business object is checked to determine whether that particular business object has been operated on (by previous subtransaction steps in a given transaction) in the current transaction context. For all business objects that have been operated on, the current state of the business object is checked against the last known state of the object in the transaction context. If a match arises, then no state change has arisen since the last time the business object was seen in the transaction context and the execution of the subtransaction step may proceed. At the completion of each subtransaction step, the business objects affected by the given transaction step are updated in the transaction context with the latest versions. If no match arises, then an isolation failure is raised, the transaction may be aborted and the recovery services invoked.

Figure 4A:
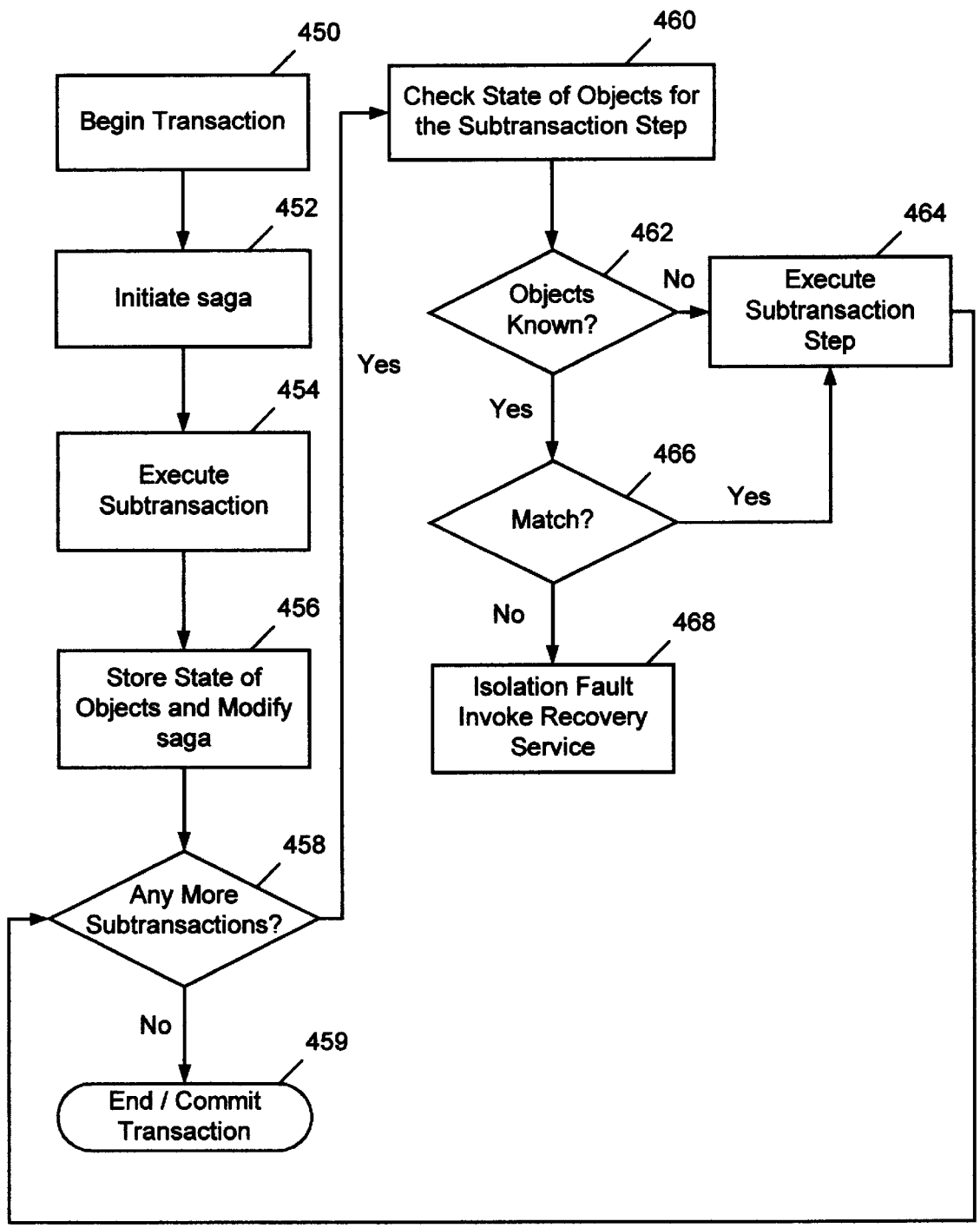
FIG. 4a is a flow diagram of a method for providing database consistency according to the invention.

FIG. 4a shows a flow control for a transaction configured with stringent isolation service, where the transaction steps are as shown in FIG. 4b along with saga as shown in FIG. 4c that would be produced by saga service 228.

Transaction 400 is initiated (450). The first subtransaction forward execution step 402 associated with transaction 400 provides for the creation of a NewEmployee object 404. Saga is initiated (452) and the first subtransaction step is executed (454). A saga 420 is created in which a compensating record 406 for this subtransaction is stored along with state information associated with all objects which are affected by the compensating subtransaction (456).

A check is made to determine if more subtransaction steps are provided in the transaction (458). If not, the transaction may be committed (459). If more transaction steps are to be processed, a check (460) is made to determine for all business objects affected by the next subtransaction step if the particular business object is known in the transaction context. The check is performed at the API level as is discussed below.

By known, we mean that the business object has been previously affected by a subtransaction provided as part of transaction 400. Note, the logic that must be executed by the transaction service prior to execution of the subtransaction or any compensating transaction. If no business objects are known (462), the subtransaction step executes (464).

If business objects are known (462), then the existing condition for the business object is compared to the last known state of the business object (466). The motivation here is to ensure that no other transaction has modified this object between the last time the executing transaction modified it and the present time. If this check succeeds, then the subtransaction is executed at step 464. If not, an isolation fault is identified (468) which will invoke the recovery service to begin execution of compensating transactions at level n-1.

As each subtransaction is executed, saga is modified to log the compensating transaction for the particular subtransaction that just was committed. Saga 420 is arranged in levels. Each level corresponds to a committed subtransaction. A new entry is added each time a subtransaction competes execution. In this way, when a subtransaction fails, rollback may proceed from the last successful subtransaction execution step. After (or concurrent with) the first transaction step 402 is committed, then a compensating transaction is added to saga 420. In this example, the compensating transaction for undoing the first transaction step committed in the transaction includes the deletion of the newly created employee object (as indicated by delete verb 410 and object 412). As steps of transaction 400 are committed, entries to saga are made to allow for the systematic undoing of the subtransaction steps. When all subtransactions complete the transaction is deemed committed and the saga is discarded.

Subtransaction Locking and Object Checking

Locking at the subtransaction level may be required to ensure transactional isolation until the subtransaction operation is completed. However, no locking arises at the transaction level. Specifically, when a business object has been identified as being affected by a given subtransaction, the record associated with the business object may be locked for the period of time until the particular subtransaction step is completed and all object data has been stored. This locking function is invoked through an isolation level 3 read. Isolation level 3 reads result in the temporary locking of data up and until any change associated with a given subtransaction step is invoked. A lock is placed on the record until the subtransaction is completed.

State verification service 225 may be invoked to check the state of each object affected in a subtransaction step. State verification service 225 may perform these checks at server 220 or may utilize functionality in the APIs to perform the checking function.

For example, during forward progress the transaction subsystem optimally stores the necessary state information (using the repository) of an operation as described above for each service level. The network subsystem (in conjunction with the operating system) may send operation and state information to the API for each subtransaction step. When the request arrives at the API, the API may use the state information along with the operation to perform an atomic test and set operation. If the atomic test and set operation is successful, a status of success is returned to the server machine (and ultimately the business logic) otherwise a status of failure is returned. If an operation fails at any time then the process of "undoing what was done" is initiated through the recovery service.

API 240 may invoke an atomic test and set in application 251 to read a record from database 252 and lock the record until an equivalence determination can be made by the API. More specifically, the transaction system transfers to the API the last known state of the particular business object associated with the given record along with any change information (as indicated by the particular subtransaction step). If the last known state is consistent with the state of the object in the transaction context, then an update to the record is performed. Else, no update is performed by the API. Note that the locking that is performed is again only handled on a subtransaction level. Accordingly long term locking of data records in database 252 is not required to support what may be long-lived transactions executing on server machine 220.

When an isolation fault has been identified, compensating transactions as indicated in the saga queue may be executed according to a first-in-last-out methodology to rollback to a consistent state. For the stringent isolation level, the rollback operation is performed in a similar fashion to the run-time execution. That is, prior to the execution of each compensating transaction, the state of all business objects affected by the given compensating transaction step is verified to determine if it is known in the transaction context. If any object is known and its state does not match the last know state as defined within the transaction context then an isolation fault is raised. Isolation faults that arise in the conduct of a compensating transaction result in the logging of a detailed trace event and may abort the saga.

Best Effort

The difference between the stringent isolation level and best effort is very subtle. Best effort uses the same algorithm as stringent (i.e. before each subtransaction step an equivalence check is made between the saved previous state of the object and the object's current state in the transaction context) with one notable exception. When the equivalence check is made no attempt is made to check data records using isolation level 3 reads. The objects are simply read from the database (by the API), compared to the saved previous state and the operation proceeds if they are equal. If the check fails, an undo operation is begun for the saga. Those of ordinary skill will recognize that since the transaction system is not requiring repeatable reads during the equivalence check, a window is opened that may result in consistency problems in the data records. The intent here is to provide as much consistency as possible in an environment where repeatable reads are either not supported or not available from the APIs.

Minimal Effort

The difference between minimal effort and best effort isolation is that the transaction service does not attempt any equivalence checks before executing subtransaction steps or compensating transactions. The intent here is to provide a better performing isolation paradigm for those transaction mixes that are known to be commutative. However, using this paradigm does require that the transaction designers know the specific semantics of their transactions. Again, if a subtransaction step fails (i.e. a negative acknowledgment is received from the application) then the transaction service may invoke the undo semantics associated with the saga. For each subtransaction step executed successfully up till the point of failure, a compensating transaction may be executed.

No Effort

The no effort isolation paradigm really doesn't provide isolation at all. It simply provides that when a subtransaction step fails, a detailed event trace record is logged such that human intervention (and reconciliation of the data) is possible and the transaction stops. It's important to note that in this paradigm, when a subtransaction step fails, the saga stops and does not attempt rollback. Rather the failure event is logged and human intervention is requested.

Forward Progress and the Persistent Service

After the user has chosen an isolation level and the business logic begins execution, the persistent service associated with transaction system works to track object state information before the network subsystem is utilized to execute functionality from the application API.

As each operation is executed using the API, the transaction system intervenes to add state information such that isolation (if requested) can be maintained during forward transactional progress (as well as backward progress/rollback if it becomes necessary). This is accomplished by storing the state of each object affected by a subtransaction or compensating transaction step.

Figure 5:
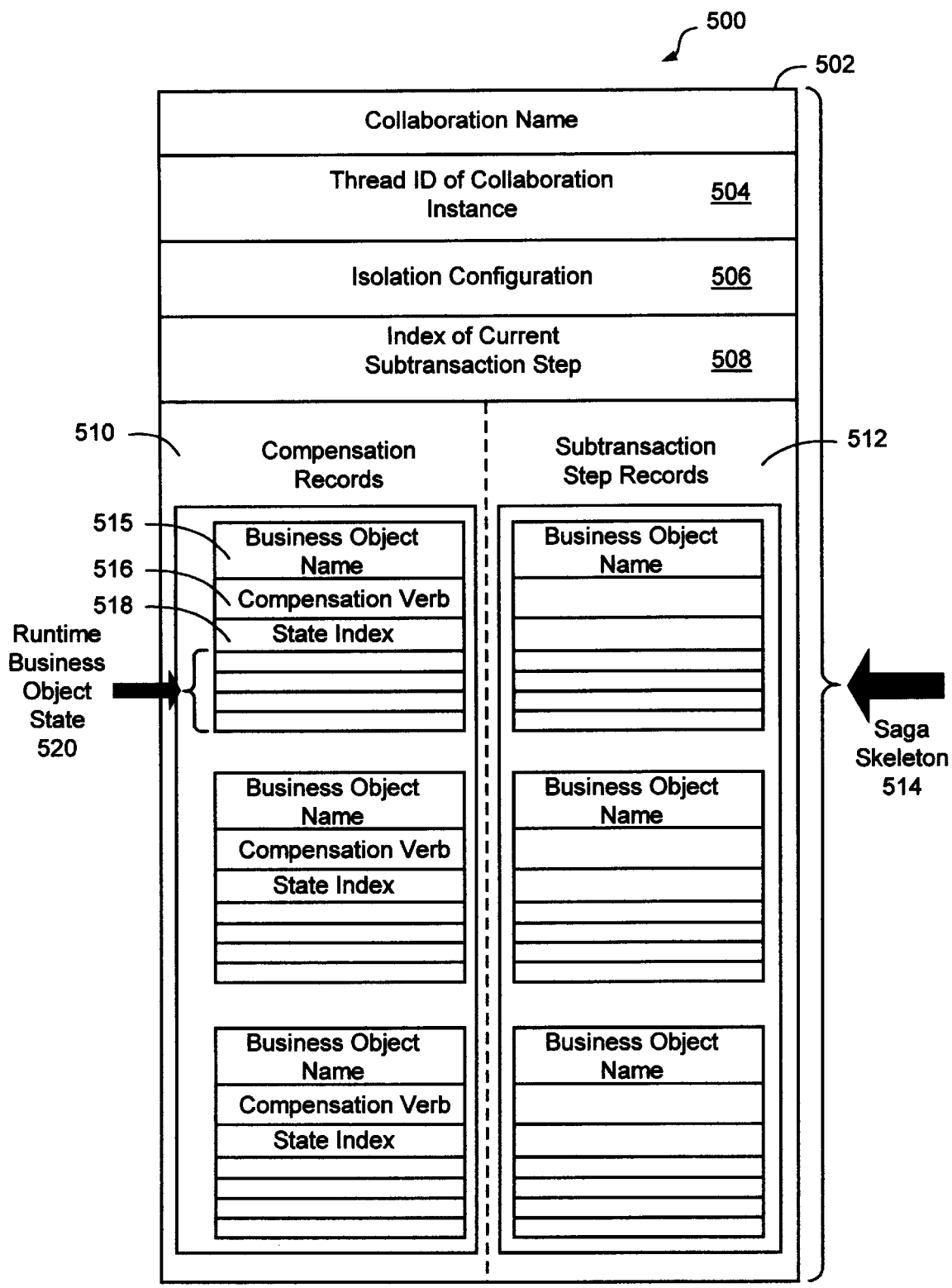
FIG. 5 is a schematic block diagram for a transaction context for storing transaction semantics according to the invention.

FIG. 5 depicts the Transaction Context 500. The transaction context defines a persistent structure that is used by the transaction system to track the necessary state information and compensation information needed to undo or recover an in progress transaction. In the preferred embodiment, a parallel image of the context is stored in memory to be referenced at run time.

The context includes a collaboration name 502, thread ID 504, isolation configuration 506, index of current subtransaction step 508, compensation records 510, subtransaction step records 512 and saga skeleton 514.

The collaboration name 502 refers to the name of the collaboration (transaction) that uses the particular transactional context. The thread ID 504 represents the instance of the transaction that is executing. Note the thread ID uniquely identifies the transaction (or the instance of the collaboration) and not the thread Id of the operating system that is executing the particular transaction. Using the collaboration name and thread id, the transaction service may locate the persistent transaction context for an instance of a transaction. The isolation configuration 506 identifies the isolation level that has been requested by the user. The index of current subtransaction step 508 indicates the currently executing subtransaction step. This information is required by the recovery service. Compensation records 510 provide the semantic undo of a subtransaction step. Each compensation record consists of a business object (important to note here is that the state of the business object is filled in by the persistent service during each subtransaction step execution), and a verb. As far as an API is concerned, a compensation operation is simply a business object with a verb, much the same as any other operation.

Subtransaction step records 512 are used only for transactions using best effort or stringent isolation levels. These records represent the state of the business objects as we have last seen them. Therefore, before executing a subtransaction step, the transaction service checks the object to see that its state matches the state saved in the subtransaction step record.

Saga skeleton 514 is an ordered list of records. Each record represents (at least) a compensation step that corresponds to a unique subtransaction step within the transaction. The saga skeleton includes names of any affected business objects, the corresponding compensation verb, and the state index of the subtransaction step that corresponds to this compensation record. Space may be reserved in the transaction context for storage of the runtime business object state as developed as a result of the execution of an associated subtransaction.

Saga

Saga is created and modified by saga service 228 (FIG. 2). The saga includes compensating transaction steps including a pointer (or subtransaction index) 518, the current state of all business objects that will be affected by the step 520, the verb 516 to be used for compensation and the values (or business object) 515 to be used with the compensation verb. The pointer 518 points to the associated subtransaction step that has been previously executed for which the compensating transaction defines an "undo" operation. If an object has not been modified by any previous steps in the saga then the current state is its state from the application.

Recovery Service

The recovery portion of the transaction service is required to execute compensating transactions on behalf of an aborted saga (which in turn is on behalf of an executing transaction). Recovery is also responsible for executing the appropriate logic to ensure the correct isolation level semantics when executing compensating transactions(as requested by the user). Recovery service oversees the execution of the compensating transactions defined by the saga. The recovery execution may be performed at the same isolation level as the execution of the original underlying transaction. Accordingly, stringent isolation level 3 locking or repeatable reads may be used in the rollback operations if stringent isolation level is selected. Alternatively, a different isolation level may be selected by the user specifically for recovery, if needed.

Rollback may include the execution of some or all of the compensating transactions stored in saga. Rollback may stop at a last (or user selected) persistent state and terminate. Alternatively, a contingency service may be provided for allowing continuing the forward transaction progress after the completion of the recovery steps. The contingency service may include jumping forward to continue the forward progress of a transaction after an isolation fault has been identified. For example, after an initial isolation fault is received and rollback commences, a rollback may proceed until the last persistent state (for the database) is achieved. At that point, the contingency service may jump forward to another location in the transaction and commence forward execution again. Rollback and contingency options are user definable and may be uniquely programmed by the developer in order to achieve the particular business function desired.

Figure 6:
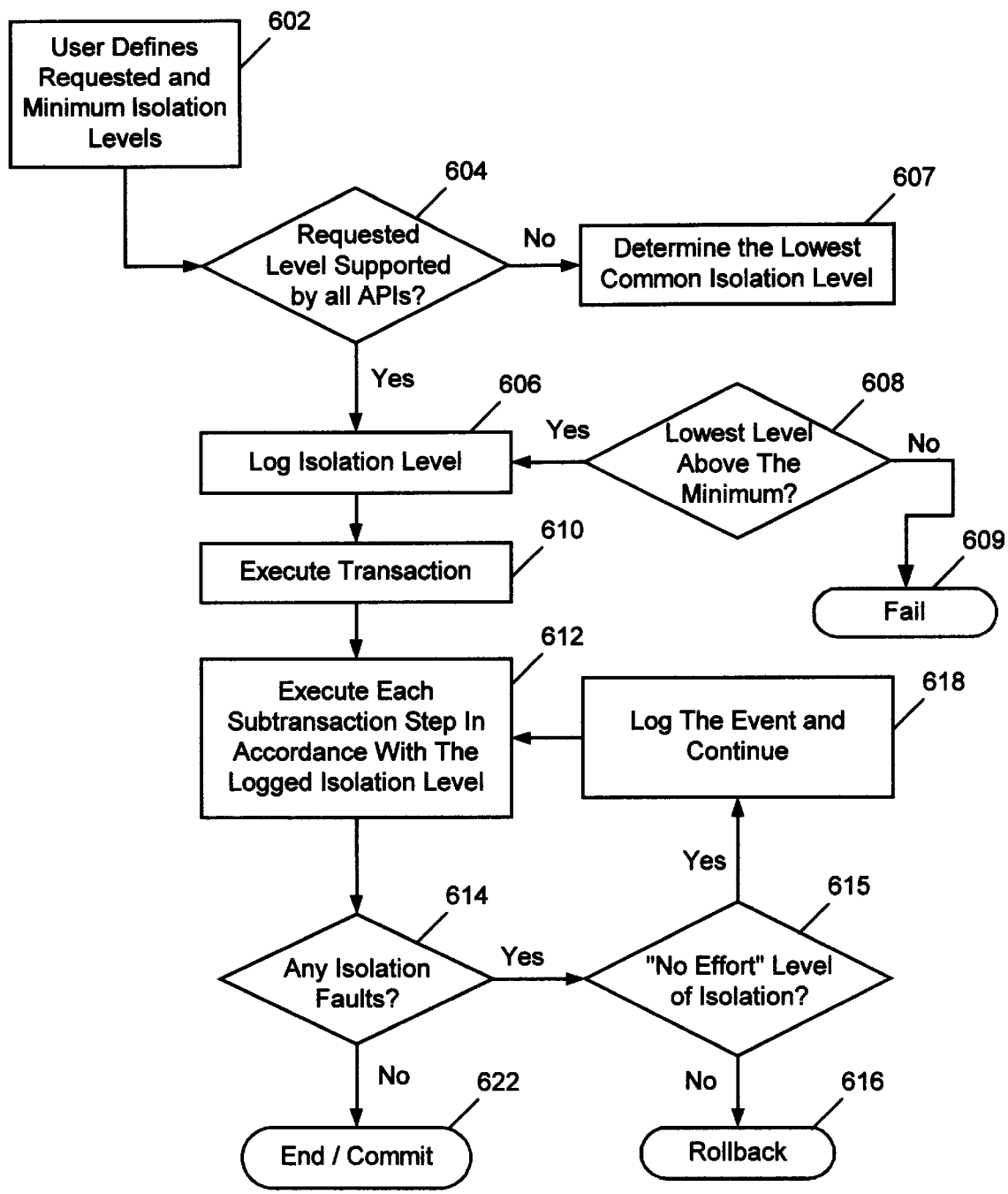
FIG. 6 is flow diagram for servicing long-lived transactions according to the invention.

Referring now to FIG. 6, a flow diagram 600 for processing transactions by a transaction system according to the invention is shown. A user is prompted to define desired (the "requested level") and minimum isolation levels associated with a given business logic function to be performed (602). The requested service level is checked against each API invoked by a given transaction to determine if the requested level of support is available (604). If the requested level is available, the isolation level is stored in the repository (606). If the requested level is not supported, then the lowest common level for the connectors is determined (607). If the lowest common level is below the minimum requested level (608), then a fault is recorded and the collaboration is not allowed to be executed (609). Else, the lowest common level is recorded as the isolation level in the repository. The particular transaction may be transitioned to the run-time mode and transactions may be executed in support of the collaboration.

At run time, transactions associated with the collaboration are executed (610). At each transaction step a check is made to determine the relevant isolation level designated, then the subtransaction is executed in accordance with the isolation level (612). In the event, isolation faults are identified (614), then the transaction may be rolled back (616) or stopped (618) depending on the isolation level. The rollback includes checking for the level of isolation, and executing the compensating subtransactions according to the isolation level for the transaction. Otherwise, the transaction continues until committing (622).

Implementation

The invention may be implemented in hardware of software, or a combination of both. However the invention preferably is implemented in computer programs executing on programmable computers each comprising a processor, a data storage system (including volatile and nonvolatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM, CDROM, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A preferred embodiment of the present invention has been described, along with some variations. Nevertheless, it will be understood that various modifications may be made without departing from the spirit and scope of the invention. Accordingly, it is to be understood that the invention is not to be limited by the specific illustrated embodiments, but only by the scope of the appended claims.

What is claimed is:

1. A transaction system implemented on a server machine for maintaining consistency in an information system supporting asynchronous transactions, the information system including a database shared among a plurality of users and implemented on a client machine, the transaction system invoked at run-time for a transaction where the transaction includes one or more subtransaction steps, the transaction system including:
   a graphical user interface for receiving a user defined isolation level selection for executing a transaction between the server machine and the database;
   a persistent service for storing object state information for each object affected in the execution of each subtransaction step; and
   a state verification service for verifying the state of each object affected by a subtransaction step to verify the state of the object is the same as a last time the object was seen in the transaction wherein if the state of the object is not the same as a last time the object was seen the state verification service is operable to raise an isolation fault and stop forward progress of the transaction.

2. The transaction system of claim 1 wherein the isolation level selection varies across a range from consistent service to continuous service where consistent service meets all ACID properties at a subtransaction level and continuous service provides no guarantees of any of the ACID properties in the execution of a subtransaction.

3. The transaction system of claim 2 where the consistent service includes isolation level 3 reads for guaranteeing consistency of reads over a time period in which each subtransaction is executed.

4. The transaction system of claim 1 wherein the isolation level selection includes stringent isolation service and no isolation service, the stringent isolation service providing compliance to all ACID transactional properties at the subtransaction level and the no isolation service providing no guarantees of any ACID properties in the execution of a subtransaction.

5. The transaction system of claim 4 further including a best effort isolation service where both the best effort service and the stringent service provide compliance to all ACID properties but the stringent service includes isolation level 3 reads to guarantee consistency over an entire time a subtransaction step is executing.

6. The transaction system of claim 5 further including a minimal effort isolation service where the state verification service is disabled and no object state checks are performed prior to execution of a subtransaction step.

7. The transaction system of claim 4 further including a no effort isolation level selection which results execution of a transaction until a consistency error is returned during subtransaction processing.

8. The transaction system of claim 1 further including
   a saga service for maintaining a linked list of subtransaction records and compensating transaction records as a transaction is executed; and
   a recovery service for implementing compensating transactions upon the occurrence of an isolation fault in a forward progress of the execution of a transaction.

9. A method implemented on a server machine for maintaining consistency in an information system, the information system including a database shared among a plurality of users and implemented on a client machine, the method invoked at run-time for a transaction where the transaction includes one or more subtransaction steps, the method including:
   selecting a predefined service level selection for executing a transaction between the server machine and the database applications;
   storing object state information for each object affected in the execution of each subtransaction step; and
   checking a state of each object affected by a subtransaction step to verify the state of the object is the same as a last time the object was seen in the transaction and if the state does not match a last known state then raising an isolation fault and stopping forward execution progress for the transaction.

10. A collaboration implemented on a server machine including business logic for directing the interaction of independent applications, the collaboration comprising:
    a plurality of connectors for communicating with a like plurality of applications; and
    an interchange server including an application collaboration module and service module, the application collaboration module defining the inter-operability between two or more applications and including a transaction having one or more subtransaction steps for delivering data to one or more connectors for transfer to an associated application, the service module including a transaction system for maintaining consistency in databases managed by the applications, the transaction system including a graphical user interface for configuring a user defined isolation level selection for characterizing an isolation level to be maintained during transaction execution, a persistent service for storing object state information for each object affected in the execution of each subtransaction step and a state verification service for verifying the state of each object affected by a subtransaction step to verify the state of the object is the same as a last time the object was seen in the transaction wherein if the state of the object is not the same as a last time the object was seen the state verification service is operable to raise an isolation fault and stop forward progress of the transaction.

* * * * *